July 15, 1969  L. N. RANDALL  3,455,161
METER FOR MEASURING UNSTEADY FLUID FLOW
Filed Aug. 2, 1965  4 Sheets-Sheet 1

INVENTOR.
Lowell N. Randall
BY *Van Valkenburgh & Lowe*
ATTORNEYS

July 15, 1969

L. N. RANDALL 3,455,161

METER FOR MEASURING UNSTEADY FLUID FLOW

Filed Aug. 2, 1965

INVENTOR.
Lowell N. Randall
BY Van Valkenburgh & Lowe
ATTORNEYS

INVENTOR.
Lowell N. Randall
BY Van Valkenburgh & Lowe
ATTORNEYS

July 15, 1969  L. N. RANDALL  3,455,161
METER FOR MEASURING UNSTEADY FLUID FLOW
Filed Aug. 2, 1965  4 Sheets-Sheet 4

INVENTOR.
Lowell N. Randall
BY *Van Valkenburgh & Lowe*
ATTORNEYS

United States Patent Office 3,455,161
Patented July 15, 1969

1

3,455,161
METER FOR MEASURING UNSTEADY FLUID FLOW
Lowell N. Randall, Littleton, Colo., assignor to Martin-Marietta Corporation, New York, N.Y., a corporation of Maryland
Filed Aug. 2, 1965, Ser. No. 476,323
Int. Cl. G01f 1/00
U.S. Cl. 73—207                             6 Claims

ABSTRACT OF THE DISCLOSURE

The flowmeter includes a thin walled, flexible, tubular-shaped member concentrically mounted in a fluid flow conduit. The member provides two fluid passageways through the conduit which produce different pressures in each passageway. There is a gap or space between the opposing edges of the member and provides for flexure of the tubular member. The tubular member flexes in response to a difference in the pressures in the two passageways and thereby varies the area of the gap. The area of the gap is sensed by a magnetic means which measures the extent of flexure and in turn the differential in pressure in the fluid passageways.

---

This invention relates to means and apparatus for the measurement of fluid flow in a closed conduit, and more particularly to the measurement of rapid variations in the rate of flow within a conduit. As such, the invention will be called a "meter for measuring unsteady fluid flow."

The flow through a closed conduit, which will also be referred to as a "line," may be measured by several completely different methods and types of apparatus. However, the most common method of measuring flow in a line, and the only one of which need be considered herein, involves a construction in the line to create a region of increased velocity and reduced pressure. The difference between the reduced pressure in the constriction and the pressure at another point in the line provides an indicia of the flow rate, a practical application of Bernoulli's principle concerning fluid flow. Such a constriction in the line may be a venturi meter or any of several types of orifice meters. These meters are ordinarily calibrated by comparing line pressure differences with volumetric measurements, but calibration data may also be obtained by using known coefficients and theoretical considerations, either approach providing results which are accurate within 2 to 5 percent in most field installations.

It would seem that meters of this type would be able to measure comparatively rapid variations of fluid flow and even pulsations of an extremely sudden nature and of a very short duration, but as a practical matter, venturi meters and orifice meters, as conventionally set up, do not measure flow variations even though it is recognized that no fluid flow is truly a "steady flow." Instead, the gages used with these meters are designed to damp out fluctuations and indicate an average pressure from which the flow is determined. This damping action is accomplished by using gages having considerable inertia in their moving components and in enlarged fluid gage lines extending from piezometer taps at the meter to the gage, and also by constricting the fluid lines to damp out fluctuations. It is recognized that such averaging out of pressure variations does not produce accurate results. Flow rates are a function of the square root of the pressure, and more nearly true averaging out would be a root-mean-square average, as is commonly used where discrete observations are made of a physical phenomenon.

2

It has been generally concluded that, even though the pressure measuring gages could be made sufficiently sensitive to respond to the pressure changes brought about by sudden changes of flow, they would then be so sensitive that they would also respond to the pressure changes which are brought about by acceleration of the body of fluid within the line between the piezometer taps at the constriction and elsewhere in the line. Also, the gages would be sensitive to pressure waves due to the elasticity of the fluid, such as water hammer surges, and other effects, which may be collectively referred to as noise, which strike the piezometer taps at different time intervals in their movement through the line. Even though such pressure waves may occur for only very short time intervals, they have a considerable effect on the gage readings when a sensitive instrument is used. Moreover, the pressure variations in a line due to acceleration and elastic effects are often as much or more than pressure differences caused by the flow, and will effectively mask pressure changes responsive to variations of flow, whenever conventional types of instruments are used.

Nevertheless, there is a need for a meter to measure unsteady flow. It is a common occurrence to place a flow meter, carefully calibrated in a laboratory, in a field installation where fluctuating of the flow rate cannot be controlled and is irregular, and subsequently discover that the meter is not accurate. A flow meter capable of measuring unsteady flow and for improved gages for properly averaging and integrating the flow indicating pressures would provide a degree of accuracy not now possible.

There is also a growing need for a flow meter for measuring unsteady flow which is capable of properly indicating sudden pulses and surges of fluid through a line, as in certain liquid-fuel rocket motor systems which are adapted to operate in an intermittent manner. Also, in connection with fluid computer and analogue systems, where both air and liquid are used, there is a need for improved means for measuring unsteady flow, which is reversing and may actually be pulsating.

With the foregoing considerations in view, the present invention was conceived and developed and comprises, in essence, a flow meter for a closed conduit which divides the conduit into two parallel passageways in the meter portion, with each passageway being selectively formed to create a different flow pattern between the two passageways and thus produce a differential pressure response between them, as flow passes through the meter. The invention further contemplates the use of an improved and simplified pressure indicating means in or between the passageways which are specially located in the conduit in a transverse alignment with respect to the flow. The invention further contemplates the use of pressure indicating means combined with a gage system having a rapid response to variations of pressure and capable of transducing this response to electrical systems with readout devices capable of indicating a correct average flow and a correct total discharge.

The fundamental operation of such a flow meter is to indicate the pressure differential between the two passages through the meter at a specific, common, transverse location. Such pressure indications are converted to electrical signals which are calibrated to indicate the rate of flow. At the same time, because of the transverse arrangement of the pressure indicating means, the pressure effects caused by acceleration of the fluid in the conduit, when it is changing its rate of flow, and the elastic waves travelling through the fluid in the conduit strike the pressure indicating means in both passageways simultaneously in mutual opposition and are thus effectively cancelled.

It follows that a primary object of the invention is to provide a novel and improved flow meter for measuring unsteady flow which will respond to rapid changes of the flow rate through a closed conduit and respond to pulsations of flow which may be in the order of 200 cycles per second and higher.

Another object of the invention is to provide a novel and improved flow meter for measuring unsteady flow which is highly sensitive to pressure differences in the passages through the meter caused by differing velocity patterns, but is insensitive to pressure surges in the line which are caused by accelerating the mass of fluid as it changes velocity, or by elastic waves, such as water hammer waves and noise passing through the body of fluid in the conduit.

Another object of the invention is to provide a flow meter for unsteady flow, capable of responding to fluctuations of the rate of flow and of transmitting the pressure effects induced by the flow as electronic signals through improved and simplified transducers and to readout devices, such as a type capable of indicating a root-mean-square average of a varying signal, whereby to provide precise flow rate in the meter.

Another object of the invention is to provide a flow meter for field use which measures the flow in pipe lines, or the like, capable of indicating an accurate average flow and an accurate total of the quantity of fluid passing through the line in any selected time interval.

Another object of the invention is to provide a novel and improved flow meter for measuring unsteady flow which is capable of accurately indicating the quantity of flow when fluid is passing through the line as a surging, intermittent flow, and also capable of measuring oscillating and pulsating flows and the reversing of flow in a line.

Another object of the invention is to provide a novel and improved meter for measuring unsteady flow of a fluid, which may be a liquid or a gas, whenever the flow of the latter is less than its critical velocity.

Another object of the invention is to provide a novel and improved means of instrumenting a flow meter to respond to rapid pressure variations of an unsteady flow.

Another object of the invention is to provide, in a flow meter for measuring unsteady flow, a novel and improved pressure responsive means within the meter which is well balanced, highly sensitive, capable of rapid response and capable of being correlated with a transducer to indicate its responses as electrical signals, as on a meter or oscillograph.

With the foregoing and other objects in view, all of which more fully hereinafter appear, my invention comprises certain constructions, combinations and arrangements of parts and elements as hereinafter described, defined in the appended claims and illustrated in the preferred embodiments shown in the accompanying drawings, in which:

Figure 1:
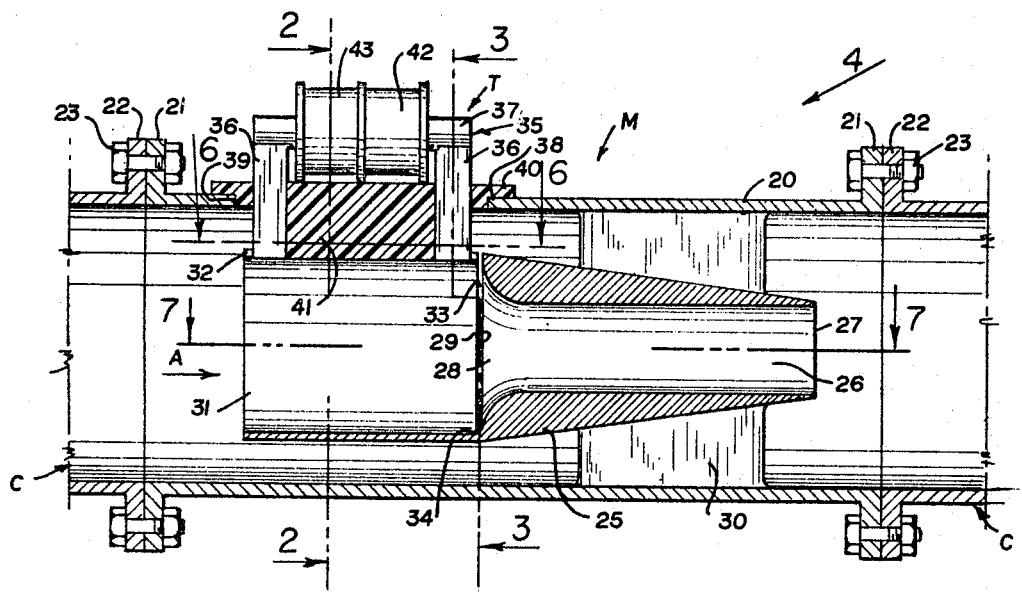
FIGURE 1 is a longitudinal sectional view of a preferred construction of the meter mounted in a closed conduit.

Referring more particularly to the drawings, a preferred construction of my improved meter M is illustrated FIGS. 1 through 6. The meter is designed to be mounted within a reach of a closed conduit C, as where a section of the conduit is separated to receive the meter. Accordingly, the meter is encased within and includes a short, tubular body 20 which has an internal diameter the same as the internal diameter of the conduit to eliminate interruptions of flow through the conduit. Each end of this body 20 includes flanges 21 which are adapted to connect with mating flanges 22 at the abutting ends of the conduit C and to be held together in alignment by a plurality of circumferentially spaced connective bolts 23. It is to be noted that other conventional modes of interconnecting the body and the conduit may be used.

The meter structure within this body tube 20 includes a head 25 formed as an axially symmetrical, frusto-conical member centered and axially aligned in the body tube. A cylindrical bore 26 extends through the head 25, the diameter of the bore 26 being substantially that of the apex end 27 of the conical head, so that flows through the bore and about the head will merge together with a minimum of turbulence. The opposite end of this bore 26 is formed as a bellmouth 28 at the base 29 of the head. This conical head is supported within the body tube 20 by a radial array of longitudinally disposed vanes 30 forming a spider to mount and center the head 25 within the body tube 20.

The form and proportions of the head 25 are optional and may be established by experiment. It may be proportioned such that the area of the base 29 is approximately half of the cross sectional area of the tube 20. The cross sectional area of the bore 26 through the head may be approximately half of the area of the base 29. Also, the angle of the conical surface of the head 25, with respect to the axis thereof, is preferably approximately seven degrees.

The head 25 divides the flow through the meter and with the proportions set forth, a substantial amount of the flow passing through the conduit will be directed through the head and the remainder will flow around the head. The bore 26 through the head is a part of an inner passageway through the meter and the annulus through the body tube, about the head, is a part of an outer passageway through the meter. The comparatively flat, conical surface of the head is such that divergence of flow in the outer passageway, commencing at the base 29 and extending towards the apex 27, as in the direction of the indicated arrow A at FIG. 1, will be sufficiently gradual as to prevent undue turbulence and disruption of the flow as the velocities are reduced.

The actuating member of the meter is a flexible gage ring 31 mounted on the head 25. This ring, of magnetic material, formed as a short, thin walled tube and having an external diameter the same as the diameter of the head base 29, is secured to this base to form an extension thereof in common axial alignment therewith. This ring is split by a longitudinally disposed slot 32, as in FIG. 2, and a major portion of its end adjacent to the base 29 is separated from the base by a transverse slit 33, the slit terminating at the edge of the ring opposite the slot 32 to leave a narrow neck 34 connecting the ring with the head 25, as in FIGS. 1 and 3. In the illustration at FIG. 1, the gage ring and the head are formed as a unitary member, but they may be formed as individual members and may be welded or otherwise fastened together at the neck 34.

With the construction above described, the flexible gage ring 31, cantilevered from the base of the head 25, forms another part of the inner and outer passageways of the meter. Flow through the conduit approaching this gage ring, as in the direction of the indicated arrow A, is diverted both about the gage ring 31 and through the gage ring in a substantially uninterrupted manner. The flow through the outer passageway, in the annular portion about the gage ring, is increased in velocity and reduced in pressure by the draft tube effect of the diverging portion formed by the conical head 25 extending therebeyond. Flow into the gage ring is reduced in velocity and increased in pressure by being forced into the smaller bore 26 in the head. Nevertheless, the velocities in the conduit at each end of the meter must be the same and the individual velocities through the varying sections of the inner and outer passageways must differ to accomplish this result. Accordingly, the pressure differences between the inner and outer passageways act upon the gage ring 31. The slotted ring, a thin, flexible member, yields to widen the slot 32 when flow velocities through the line are increased and increase the pressure inside the ring and decrease the pressure outside the ring. Conversely, the slot will narrow as the flow velocities decrease.

The variation of the width of the slot 32, a function of velocity through the conduit C, may be easily measured, as by a transducer means associated with a gage calibrated to indicate flow rates for various movements of the ring 32. A preferred type of transducer T embodies the use of a magnetic circuit comprising a horseshoe type magnet 35 having its ends spaced between, but not touching, the walls of the slot 32, with the ring 31 completing the magnetic circuit. Very slight changes of the gap between the ends of such a magnet and the sides of the slot 32 will produce measurable changes in the inductance effects of coils mounted on the magnet.

Figure 2:
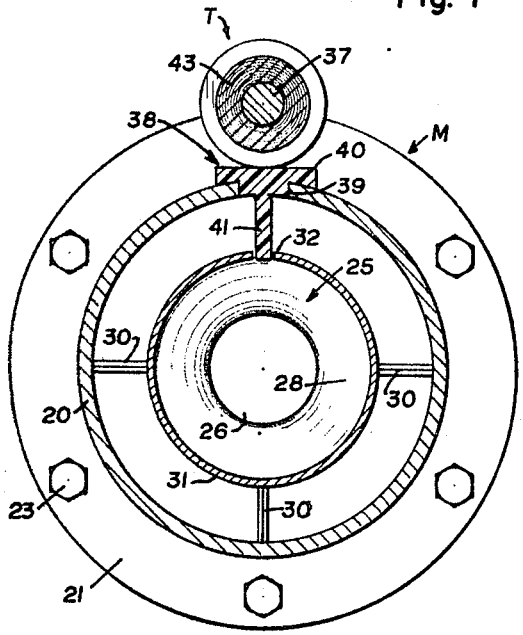
FIGURE 2 is a transverse sectional view as taken from the indicated line 2—2 at FIG. 1, but on an enlarged scale.
Figure 3:
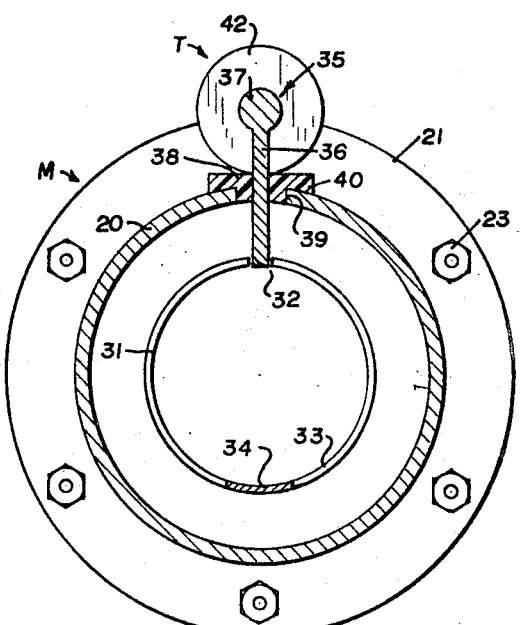
FIGURE 3 is a transverse sectional view as taken from the indicated line 3—3 at FIG. 1, but on an enlarged scale.
Figure 4:
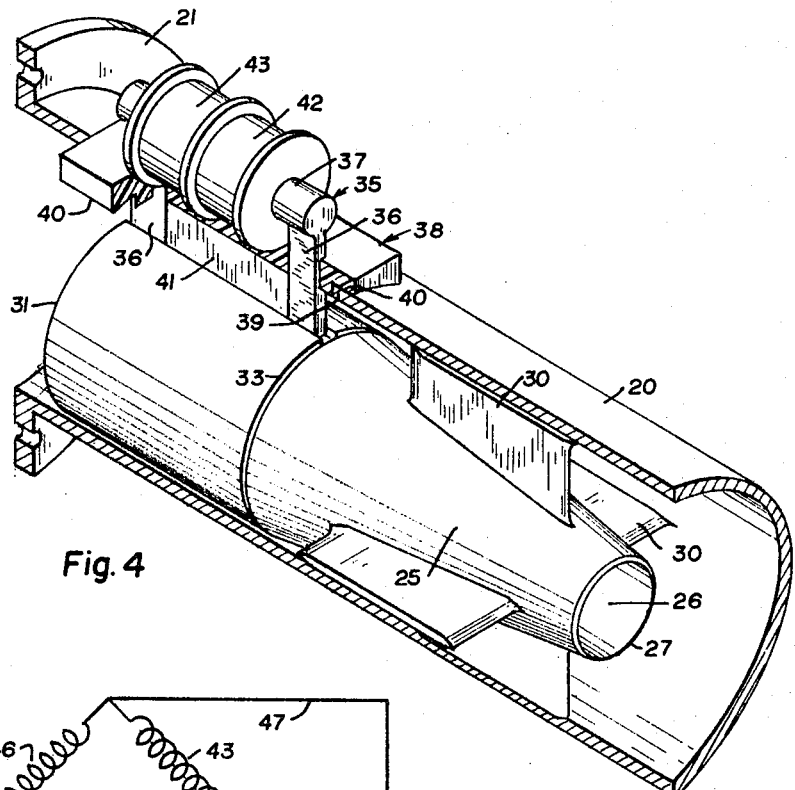
FIGURE 4 is an isometric view of the meter as in the direction of the indicated arrow 4 at FIG. 1, but with portions of the shell of the meter being broken away to show the interior thereof.
Figure 5:
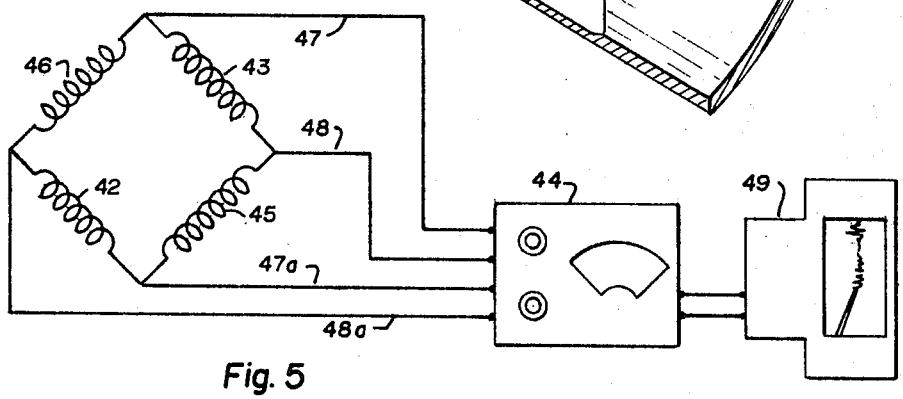
FIGURE 5 is a representative circuit diagram which may be used in connection with the transducer components of the meter illustrated at FIGS. 1 through 4.
Figure 6:
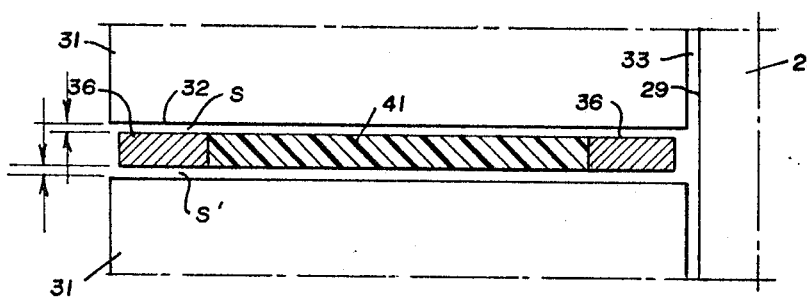
FIGURE 6 is a fragmentary, sectional view of a signal pickup arrangement in the meter, as taken from the indicated line 6—6 at FIG. 1, but on a greatly enlarged scale and with the spacing between the respective components being somewhat exaggerated for purposes of illustration.

The magnet 35 includes a pair of comparatively narrow, flat arms 36 connected together by an armature 37. This magnet is snugly mounted on a cap 38 of plastic or other non-magnetic material which, in turn, is mounted in a longitudinal opening 39 in the body tube 20 above the slot 32 to place the arms in a longitudinal plane extending radially outwardly from the slot 32, with the armature 37 being outside the tube 20. The cap 38 is a narrow member to conform with the opening 39 and includes a lip 40 to better set upon the tube 20. The cap may be secured in place by any suitable means, such as an adhesive or with bolts, if it is to be removed from time to time. The inner surface of the cap is arcuate to be flush with the passageway of the body tube, as illustrated at FIGS. 2 and 3. A tongue 41 extends from the inner edge to fill the space between the arms 36 of the magnet to form, in conjunction with the arms, a flat, longitudinally disposed, vane-like structure extending radially inwardly from the body tube, with the edge thereof lying in the slot 32. It is to be noted that the spacings S and S' which exist between this arm-tongue filler member and each wall of the slot 32, illustrated at FIG. 6, which are necessary for measurement of flexure are so slight that no significant leakage of fluid will occur from the inner passageway to the outer passageway.

A pair of coils 42 and 43 are mounted upon the armature 37 of the magnet, and each coil may be rendered sensitive to variations in the magnetic circuit formed by the magnet and the gage ring. The coils are connected in any circuit suitable for the purpose at hand and capable of producing a substantial output to operate readout meter 44. A suitable circuit for this purpose is diagrammatically illustrated at FIG. 5, where each coil 42 and 43 constitutes opposing legs of a four-leg bridge. The other pair of opposing legs of this bridge may include resistors, but are preferably coils 45 and 46 which are comparable to solenoids 42 and 43, and are adapted to balance the bridge and also compensate for temperature variations and other minor factors in the apparatus.

The four corners of the bridge are connected with lead wires 47, 47a, 48 and 48a which extend to the readout meter 44. This meter may be of a type having a needle adapted to quickly respond to changes of reading, or it may be adapted to provide an averaging out of signals operative on a desirable root-mean-square basis. Also, in connection with the readout box 44, the circuits may be connected with an integrating device or even with an oscillograph 49 which can give a diagrammatic indication of the flow variations for a permanent record, if such is necessary.

Accuracy of the meter above described is enhanced because a correct signal occurs between the gage ring and the armature legs, even when the spacings S and S' between the sides of the slot and the ends of the magnet is not uniform. Should any irregularity of this spacing occur, as by a misfit of parts, or should the meter be subjected to vibrations which affect this spacing, the reduction of spacing at one side will offset the increase in the spacing at the opposite side. Thus, such factors concerning the spacing S and S' not related to fluid pressure in the line will not mask the desired results, when the meter is used to measure flow.

It is to be noted that, when the gage ring functions, as in the manner described, to expand or contract with a changing of width in the slot, the magnetic circuit varies accordingly. Thus, the variations of flow rate are transduced to variations of electrical current which may be calibrated and measured. It is to be noted that the response is very rapid, for the inertia of the ring 31 may be very small compared with its stiffness and the inertia of the water body surrounding the ring. Moreover, any responses to pressure not associated with flow through the meter are self-compensating and will not be transduced. Once the gage is calibrated, it will remain very stable.

Tests demonstrated that the effects of fluid acceleration and noise were substantially eliminated in this gage, and that, for all practical purposes, it would record only pressure differences due to variation of flow rate, and thereby produce a meter which would measure unsteady flow. It was also discovered that the apparatus above described could be effectively used where the flow rate actually reversed, under which circumstances the low pressure was within the gage ring 31 and the higher pressure about the gage ring. The discharge coefficients under such reversed flow were different from those when the flow was in the direction of the indicated arrow A, FIG. 1, which necessitates different calibration curves at the readout meter 44.

While the apparatus is described as being used with a liquid fluid, it is recognized that a meter of this form can be used for air or gas flow at velocities less than the critical velocity. A thin and very flexible gage ring 31 will be required. However, its performance cannot be predicted with air velocities greater than the critical velocity, the same as with any other meter.

Figure 7:
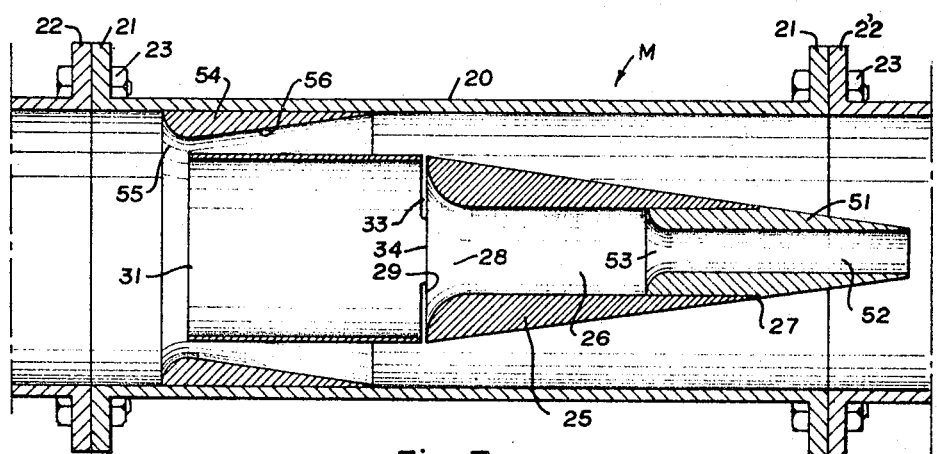
FIGURE 7 is a longitudinal sectional view as taken from the indicated line 7—7 at FIG. 1, but illustrating the meter as being modified by constrictive elements to render it more effective at low rates of discharge through the line to which it is connected.

A number of variations in the construction of this unit are possible. Where the flow meter for a given size conduit is used in a closed conduit having exceedingly low velocities, and it is desired to enhance the sensitivity of the unit, constrictions in both the inner passageway and outer passageway may be employed, as shown at FIG. 7. The modification to restrict the inner passageway is a tubular insert 51 in the central bore 26 of the head 25, this insert having a conical end forming an extension of the conical surface of the head and a reduced diameter, axially centered bore 52 therethrough, with a bellmouth entrance 53 therein. The modification to restrict the outer passageway may be an annular insert ring 54 adapted to be fitted within the body tube 20 opposite the gage ring 31 to reduce the area of this outer passageway. This insert ring 54 is suitably belled at the upstream side, as at 55, and sloped at the downstream surface 56 to provide for a minimum disruption of flow. Also, the ring 53 is longitudinally slotted, in a manner not shown, to fit about the magnet arms 36 and tongue 41 when it is set in place. While the insert 51 and ring 54 reduce the area of the inner and outer passageways and materially affect the pressures due to flow effects, these changes do not significantly affect the pressure effects due to acceleration or elastic waves passing through the line which are simultaneously registered on the inner surface and outer surface of the gage ring.

Figures 8, 9:
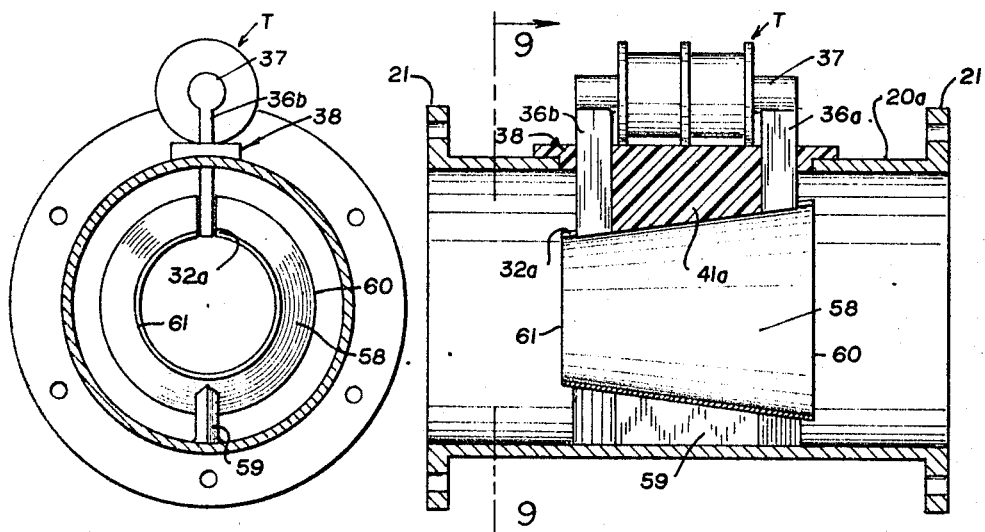
FIGURE 8 is a longitudinal sectional view, similar to FIG. 1, but illustrating another embodiment of the meter especially adapted for reversing and pulsating flow.
FIGURE 9 is a transverse sectional view as taken from the indicated line 9—9 at FIG. 8.

FIGURES 8 and 9 illustrate a simplified gage construction which eliminates the supporting head and provides for a gage ring 58 in the form of a conical frustrum which is mounted upon a longitudinally disposed pylon 59 secured to the side of the body tube 20a with the longitudinal slot 32a and the transducer T being disposed at the opposite side of the pylon. The transducer within this unit is similar to that heretofore described, except the extended edges of the arms 36a and 36b and the lip 41a are inclined with respect to the axis of the body tube to fit within the slot 32a of the gage ring, as illustrated. It is to be noted that with this conical gage ring anchored to the body tube of the meter, it will be more sensitive to external vibration than the construction heretofore described.

This modified meter, using a conical gage ring 58, is especially adapted for measuring flows which reverse completely. A flow in the direction of the indicated arrow A, at FIG. 8, will produce a reduced pressure within the ring, the internal passageway, and increased pressure outside the ring, the external passageway, while a flow in the opposite direction will produce the opposite effect. The diameter of the base edge 60 and of the apex edge 61 of this conical ring are illustrated as being such that the respective cross sectional areas are approximately ⅔ and ⅓ the cross sectional area of the diameter of the body tube 20a, and it is to be noted that these respective diameters may be selected to produce substantially the same discharge coefficient with flow in either direction, thereby materially simplifying interpretation of signals by the transducer means to correctly represent flow in either direction. The slope of the conical ring 58 may be comparatively flat, and preferably approximately seven degrees from the axis to produce a minimum turbulence from expansion of flow in either direction.

Figure 10:
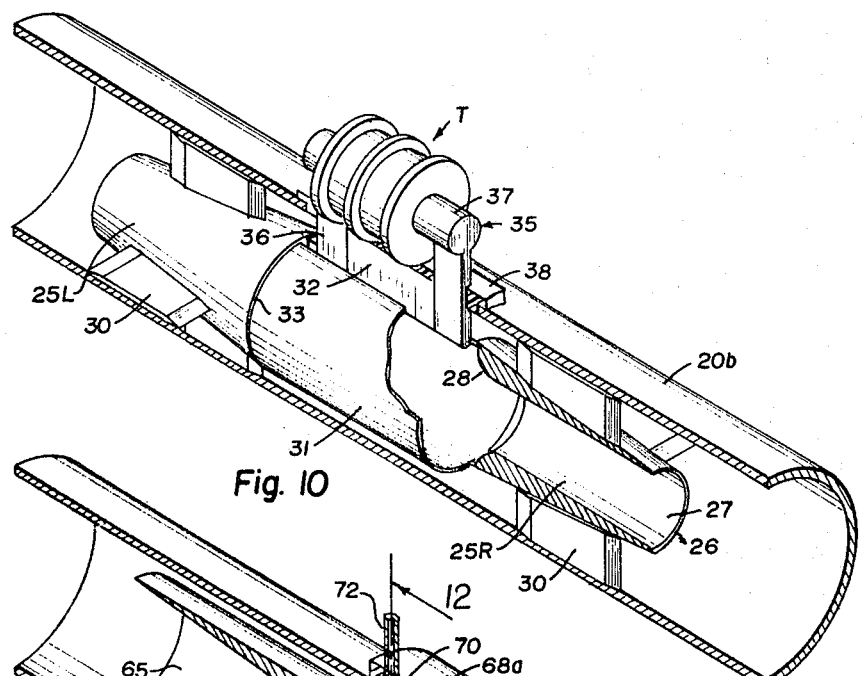
FIGURE 10 is a longitudinal sectional, isometric view of a meter similar to the FIG. 1 construction, but modified to provide a symmetrical arrangement of components therein.

The modified gage construction illustrated at FIG. 10 is substantially the same as the construction heretofore described, but includes a pair of heads 25L and 25R, with a gage ring 31 being mounted between them, and the body tube 20b is increased in length to accommodate these opposing heads. The transducer means T including the magnet 35 and other components are substantially the same as those heretofore described. Operationally, this modified unit, which is symmetrical from each side of a central transverse plane of the unit, provides for an inner passageway wherethrough the velocity of flow is reduced within the gage ring, and an outer passageway wherethrough the velocity of flow is increased at the gage ring, somewhat the same as the velocity of flow is increased at the throat of a venturi meter. It is to be noted that the coefficient of flow will be substantially the same with flow in either direction, but that a reverse of flow will not normally be indicated with a meter of this construction.

Figure 11:
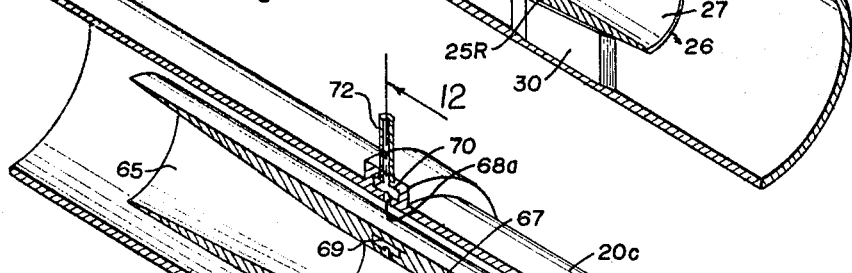
FIGURE 11 is a longitudinal sectional, isometric view of yet another modified construction of the meter employing a different, more conventional mode of sensing pressures within the passageways of the meter.
Figure 12:
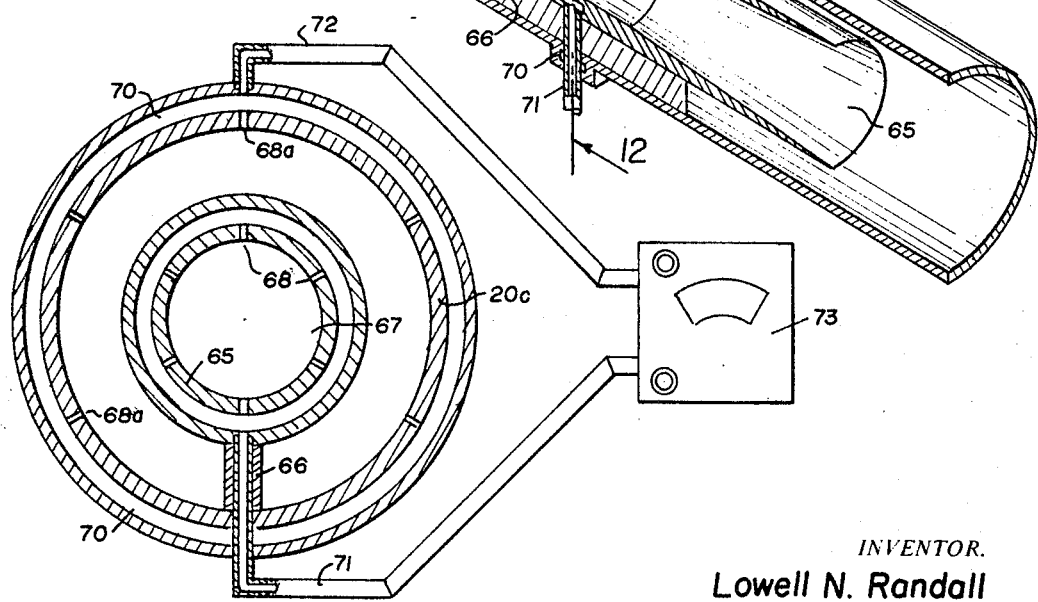
FIGURE 12 is a transverse sectional view as taken from the indicated line 12—12 at FIG. 11, but on an enlarged scale and including, in a diagrammatic manner, an arrangement of connecting the pressure lines to an indicating readout apparatus.

The modified gage construction illustrated at FIGS. 11 and 12 includes an inner passageway formed by an inner tube 65 mounted upon a pylon 66 in axial alignment with the body tube 20c. The internal passageway of the meter, within the inner tube 65, is constricted by a central throat 67, and the passageway diverges from this throat to either side thereof in a manner similar to that of a conventional venturi meter. The meter is preferably, but not necessarily, symmetrical from each side of a central transverse plane of the unit.

This modified gage is provided with conventional piezometric taps 68 at the throat 67 of the inner passageway and taps 68a about the body tube 20c in the same transverse plane of the throat taps. The piezometric taps in the inner passageway connect with a manifold ring 69 about the throat 67, while the taps 68a in the outer passageway connect with a manifold ring 70 about the body ring 20c. Pressure lines 71 and 72 extend from the respective manifolds to a transducer means adapted to convert the pressure indications into electrical signals or the like.

However, in contrast with the previously described apparatus, such transducer means are separate from the meter and are generally located within and are a part of a readout meter 73. The meter 73 is not specifically described, since meters suitable for the purpose are available.

It is to be noted that, whenever a pressure change due to acceleration of flow or an elastic wave passing through the line is felt at the piezometric taps, such indication must travel through the lines 71 and 72 and that these lines must be of the same length to simultaneously transmit signals to the readout meter 73 in order to effect cancellation of the undesirable pressure effects. Tests with a meter of this type demonstrated that the arrangement would measure unsteady flow, but that air bubbles could not be permitted within the manifolds 69 and 70 or the lines 71 and 72 whenever a liquid was being used, because such would cause substantial errors.

Figures 13, 14:
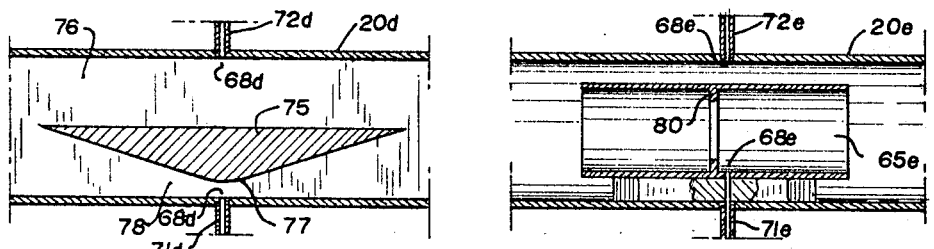
FIGURES 13 and 14 are diagrammatic, longitudinal sectional views of other arrangements embodying the principles of the invention.

The units illustrated at FIGS. 13 and 14 are diagrammatic in nature to further illustrate apparatus incorporating the principles of the invention. FIG. 13 shows a meter wherein the body tube 20d is not necessarily circular in section, and where the two passageways through the meter are not an inner and outer passageway, but are side by side. A longitudinally disposed dividing wall 75 is used with one side of the wall being parallel with the walls of the tube 20d to provide for a normal passageway 76 of unchanging section and with the other side of the wall being cambered as at 77 to form a constricted passageway 78. The unit is preferably, but not necessarily, symmetrical from each side of a central transverse plane. Piezometric taps 68d are located in each passageway at a common transverse plane and are connected by lines 71d and 72d to a suitable readout meter substantially the same as that heretofore described.

The unit illustrated at FIG. 14 is substantially the same in construction as that illustrated at FIGS. 11 and 12, except that the inner tube 65e is formed as a thin walled unit having an orifice meter 80 within it to provide for a sudden constriction rather than a venturi shaped passageway converging to a throat at the center. However, it is operative in only one direction, with the piezometric taps 68e for the tubes 70e and 71e being at a common transverse plane at the downstream side of the orifice meter 80.

I have now described my invention in considerable detail. However, it is obvious that others skilled in the art can build and devise alternate and equivalent constructures which are nevertheless within the scope and spirit of my invention. Hence, I desire that my protection be limited, not by the constructions illustrated and described, but only by the proper scope of the appended claims.

What is claimed is:
1. A flow meter for a closed conduit adapted to be mounted in a conduit and comprising:
  (a) a body portion formed as a tubular member having substantially the same internal diameter as the conduit and being adapted to be mounted in the conduit and form a portion thereof;
  (b) a head of a general frusto-conical configuration having an axially centered bore therethrough adapted to be mounted within the body portion on a common axial alignment therewith and with the base portion lying transversely of the body axis;
  (c) a gage ring affixed to the base portion of the head in common axial alignment therewith and having a diameter substantially the same as the base diameter, whereby the head and ring define an inner passageway through the head and an outer passageway about the head, with the resulting variations in the areas of the inner and outer passageways being adapted to produce pressure differences between the outside and inside of the ring responsive to flow through the meter;
  (d) said ring including a longitudinal slot therein, being of flexible material and being so proportioned as to flex responsive to pressure differences at the inner and outer sides thereof to vary the width of the slot; and
  (e) means adapted to measure the flexure of the ring and to correlate the flexure measurements with discharge through the meter.

2. In the organization defined in claim 1, wherein said ring is formed of magnetic material and wherein said means adapted to measure the flexure of the ring comprise a transducer including a magnet having arms extending to the ring and to lie within the slot, whereby movements of the ring responsive to pressure differences to vary the width of the slot vary the reluctance of a magnetic circuit formed by the ring and magnet arms.

3. A flowmeter adapted to be mounted in a fluid flow conduit comprising means for providing two separate fluid passageways in the conduit to produce pressure differences in said passageways in response to flow therethrough, pressure responsive means for sensing pressure differences in said passageways including a part exposed to the fluid pressure in each passageway and movable in proportion to the pressure difference in said passageways and means operatively associated with said part for measuring the extent of movement of said part, said part comprises a unitary thin walled, flexible member adapted to flex in response to different pressures acting on opposite sides thereof, and said flexible member is a tubular-shaped member forming said means for providing two separate passageways and having a longitudinal slot which varies in area as said tubular-shaped member flexes.

4. A flowmeter adapted to be mounted in a fluid flow conduit comprising venturi means concentrically disposed in said conduit for providing two separated fluid passageways through which the fluid flows at different flow rates through the conduit, said venturi means including a flexible wall portion exposed to the fluid pressure in each passageway, and flexible in proportion to the pressure difference acting on said portion, and means operatively associated with said portion for measuring the extent of said flexure.

5. A fluid pressure indicating device adapted to measure fluid pressure differences in two fluid passageways comprising, means exposed to the fluid in said two passageways and flexible in response to a differential pressure in said passageways for indicating the pressure differential including a tubular-shaped flexible member having an opening in the wall thereof which permits said member to flex and provides an area which changes size as said member flexes, said tubular-shaped member being formed from a thin sheet of flexible material so that the adjacent ends of said sheet when so formed are in an opposing spaced relationship and providing therebetween said changeable area.

6. A fluid pressure indicating device as defined in claim 5, wherein said tubular-shaped member is a venturi which divides the fluid flow into two streams having different flow rates which provides the differential fluid pressure on opposite sides of said tubular-shaped member.

References Cited

UNITED STATES PATENTS

| 1,652,941 | 12/1927 | Isaac | 73—213 |
| 2,372,166 | 3/1945 | McCarty | 73—208 |
| 2,760,371 | 8/1956 | Borden | 73—213 |
| 3,124,959 | 3/1964 | Pall et al. | 73—407 |
| 3,318,148 | 5/1967 | Liu. | |
| 2,660,886 | 12/1953 | Milmore. | |
| 2,760,371 | 8/1956 | Borden | 73—213 |

FOREIGN PATENTS

| 234,759 | 7/1910 | Germany. |
| 653,331 | 4/1934 | Germany. |

RICHARD C. QUEISSER, Primary Examiner

EDWARD D. GILHOOLY, Assistant Examiner

U.S. Cl. X.R.

73—211, 213